(12) United States Patent
Suh et al.

(10) Patent No.: US 10,999,033 B2
(45) Date of Patent: *May 4, 2021

(54) SYSTEM AND METHOD FOR COMMUNICATING AN ORTHOGONAL FREQUENCY DIVISION MULTIPLEXED (OFDM) FRAME FORMAT

(71) Applicant: Huawei Technologies Co., Ltd., Shenzhen (CN)

(72) Inventors: Jung Hoon Suh, Kanata (CA); Osama Aboul-Magd, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,256

(22) Filed: May 15, 2020

(65) Prior Publication Data

US 2020/0280414 A1 Sep. 3, 2020

Related U.S. Application Data

(63) Continuation of application No. 16/245,327, filed on Jan. 11, 2019, now Pat. No. 10,708,022, which is a
(Continued)

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0007* (2013.01); *H04L 5/0037* (2013.01);
(Continued)

(58) Field of Classification Search
CPC ............ H04W 72/12; H04W 72/1263; H04W 12/1273; H04L 5/0007; H04L 5/0032;
(Continued)

(56) References Cited

U.S. PATENT DOCUMENTS 10,003,441 B2 6/2018 Montreuil et al.
2005/0265221 A1 12/2005 Batra et al.
(Continued)

FOREIGN PATENT DOCUMENTS

CN 101272234 A 9/2008
CN 101778069 A 7/2010
(Continued)

OTHER PUBLICATIONS

Azizi, S., et al., "Intel OFDMA Allocations Based on 26-tone and 242-tone RUs," INTEL DensiFi Submission, Dec. 3, 2014, 16 pages.
(Continued)

*Primary Examiner* — Christopher M Crutchfield
(74) *Attorney, Agent, or Firm* — Slater Matsil, LLP

(57) ABSTRACT

An Orthogonal Frequency Division Multiple Access (OFDMA) frame communicated over a 20 MegaHertz (MHz) channel may include eight 26-tone resource units (RUs), one 26-tone bifurcated RU, and a direct current (DC) region. The eight 26-tone RUs may include twenty-six consecutive data and pilot tones, and the bifurcated 26-tone RU may be split into two 13-tone portions each of which include thirteen consecutive data and pilot tones. The DC region may include seven null tones. In one example, the DC region of the 20 MHz MU-OFDMA frame consists of three DC tones and four null-data tones.

12 Claims, 8 Drawing Sheets

Related U.S. Application Data continuation of application No. 15/006,776, filed on Jan. 26, 2016.

(60) Provisional application No. 62/107,936, filed on Jan. 26, 2015.

(51) Int. Cl.
*H04W 72/04* (2009.01)
*H04W 84/12* (2009.01)
*H04W 72/12* (2009.01)

(52) U.S. Cl.
CPC ........ *H04L 5/0053* (2013.01); *H04L 27/2602* (2013.01); *H04W 72/0453* (2013.01); *H04W 72/12* (2013.01); *H04W 84/12* (2013.01)

(58) Field of Classification Search
CPC ... H04L 5/0044; H04L 5/0048; H04L 5/0053; H04L 5/0094
See application file for complete search history.

(56) References Cited

U.S. PATENT DOCUMENTS

| | | |
|---|---|---|
| 2008/0037668 A1 | 2/2008 | Popoli et al. |
| 2009/0175324 A1 | 7/2009 | Sampath et al. |
| 2009/0296839 A1 | 12/2009 | Stadelmeier et al. |
| 2010/0182903 A1 | 6/2010 | Palanki et al. |
| 2010/0260159 A1 | 10/2010 | Zhang et al. |
| 2011/0103333 A1 | 5/2011 | Berggren et al. |
| 2011/0142158 A1 | 6/2011 | Reznic et al. |
| 2011/0150110 A1 | 6/2011 | Kenney et al. |
| 2011/0188441 A1 | 8/2011 | Kim et al. |
| 2013/0315163 A1 | 11/2013 | Zhang et al. |
| 2014/0079399 A1 | 3/2014 | Goswami |
| 2014/0370823 A1 | 12/2014 | Yu |
| 2015/0063265 A1 | 3/2015 | Seo et al. |
| 2015/0085946 A1 | 3/2015 | Kenney et al. |
| 2015/0223246 A1 | 8/2015 | Yang et al. |
| 2015/0295689 A1 | 10/2015 | Lee et al. |
| 2015/0365203 A1 | 12/2015 | Suh et al. |
| 2015/0365264 A1 | 12/2015 | Srinivasa et al. |
| 2015/0365922 A1 | 12/2015 | Suh et al. |
| 2015/0365947 A1 | 12/2015 | Suh et al. |
| 2016/0007354 A1 | 1/2016 | Chen et al. |
| 2016/0029379 A1 | 1/2016 | Kuchibhotla et al. |
| 2016/0029397 A1 | 1/2016 | Chen et al. |
| 2016/0044675 A1 | 2/2016 | Chen et al. |
| 2016/0050666 A1 | 2/2016 | Yang et al. |
| 2016/0073379 A1 | 3/2016 | Yang et al. |
| 2016/0080043 A1* | 3/2016 | Tian ............. H04L 1/06 375/267 |
| 2016/0099789 A1 | 4/2016 | Zhang et al. |
| 2016/0142187 A1* | 5/2016 | Yang ............ H04L 5/0001 370/328 |
| 2016/0302200 A1* | 10/2016 | Yang ............ H04L 5/001 |
| 2018/0006781 A1 | 1/2018 | Choi et al. |

FOREIGN PATENT DOCUMENTS

| | | |
|---|---|---|
| CN | 101964770 A | 2/2011 |
| CN | 102100103 A | 6/2011 |
| CN | 102113254 A | 6/2011 |
| CN | 102273245 A | 12/2011 |
| CN | 102396186 A | 3/2012 |
| CN | 102474386 A | 5/2012 |
| CN | 102740375 A | 10/2012 |
| CN | 103560860 A | 2/2014 |
| CN | 104823395 A | 8/2015 |
| CN | 107210875 A | 9/2017 |
| EP | 2187589 B1 | 8/2011 |
| JP | 2018502482 A | 1/2018 |
| RU | 2497294 C2 | 10/2013 |
| WO | 2006052103 A1 | 5/2006 |
| WO | 2007035447 A2 | 3/2007 |
| WO | 2010087667 A2 | 8/2010 |
| WO | 2012051319 A1 | 4/2012 |
| WO | 2013025551 A1 | 2/2013 |
| WO | 2013052079 A1 | 4/2013 |
| WO | 2013177384 A1 | 11/2013 |
| WO | 2016007389 A1 | 1/2016 |
| WO | 2016025817 A1 | 2/2016 |
| WO | 2016044298 A1 | 3/2016 |
| WO | 2016081378 A1 | 5/2016 |

OTHER PUBLICATIONS

Lin, Y., et al., "11ax OFDMA Tone Plan," QUALCOMM DensiFi Submission, Jan. 8, 2015, 20 pages.
Kim, Y., et al., "Considerations on 11ax OFDMA Frequency Granularity", IEEE 802.11-14/0082r0, Jan. 2015, 11 Pages.
Lee, D., OFDM Numerology for 802.11ax, Jan. 2015, pp. 1-19.
Yang, L., et al., "11ax OFDMA Tone Plan Leftover Tones and Pilot Structure", doc.: IEEE 802.11-15/0819r1, Jul. 13, 2015, 32 Pages.
Porat, R., et al., , "40/80MHz Tone Plans," BROADCOM DensiFi Submission, Dec. 3, 2014, 8 pages.

\* cited by examiner

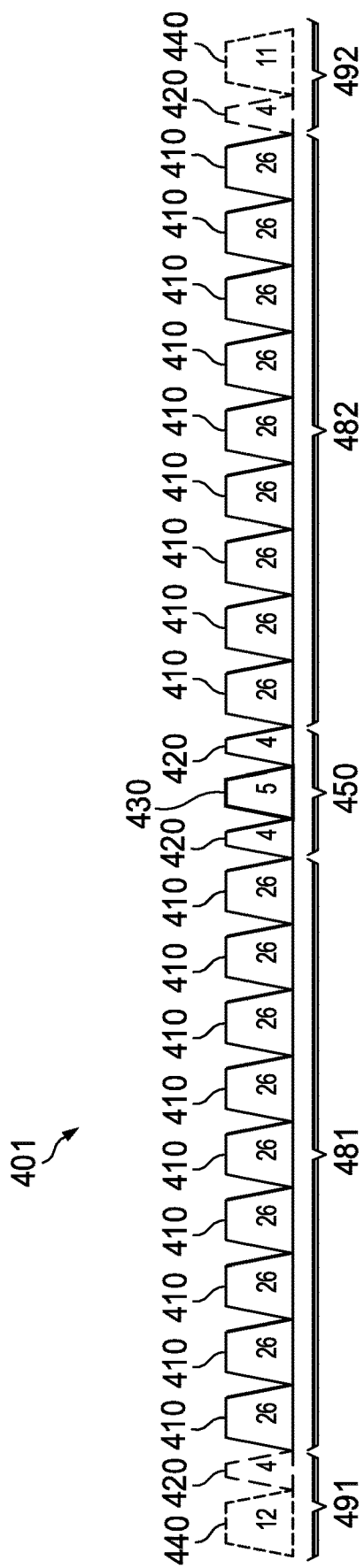
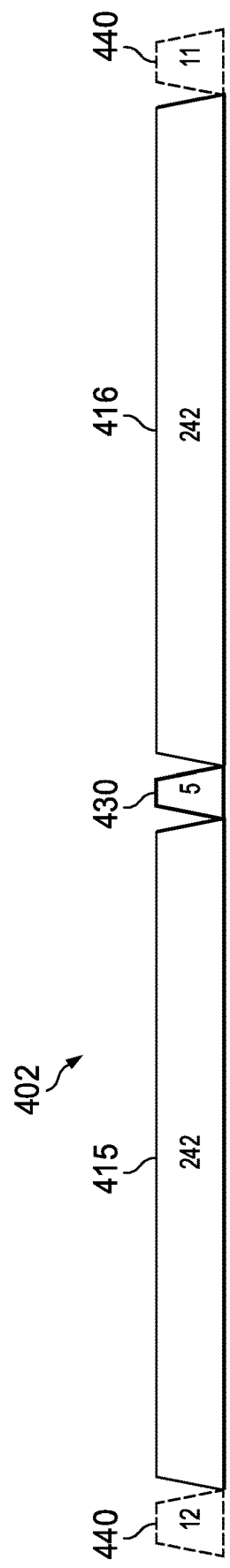
FIG. 4A
FIG. 4B

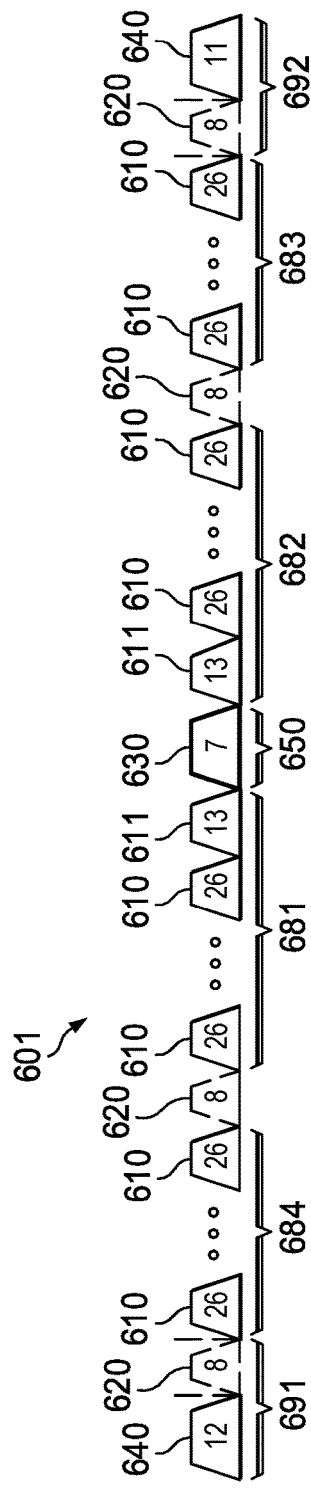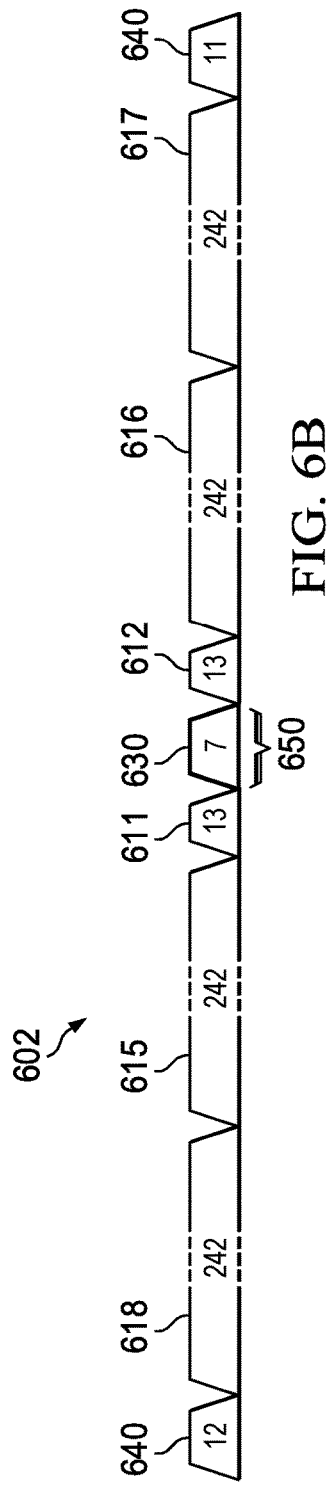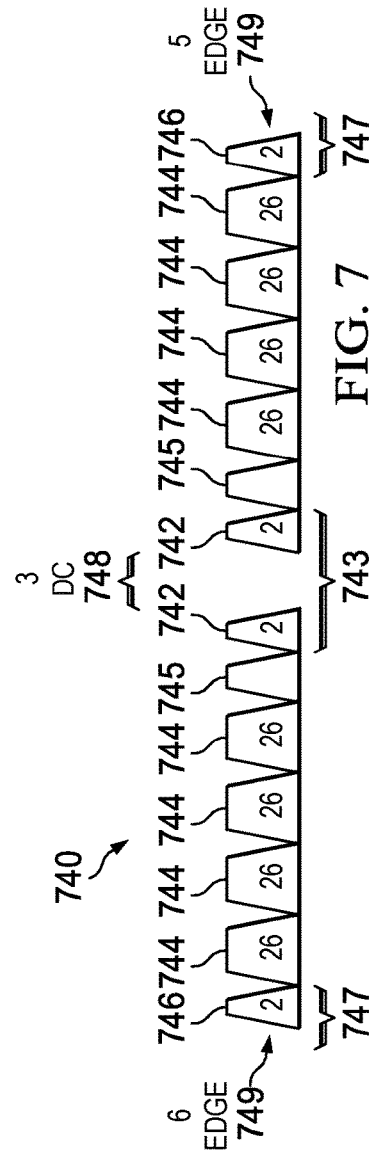

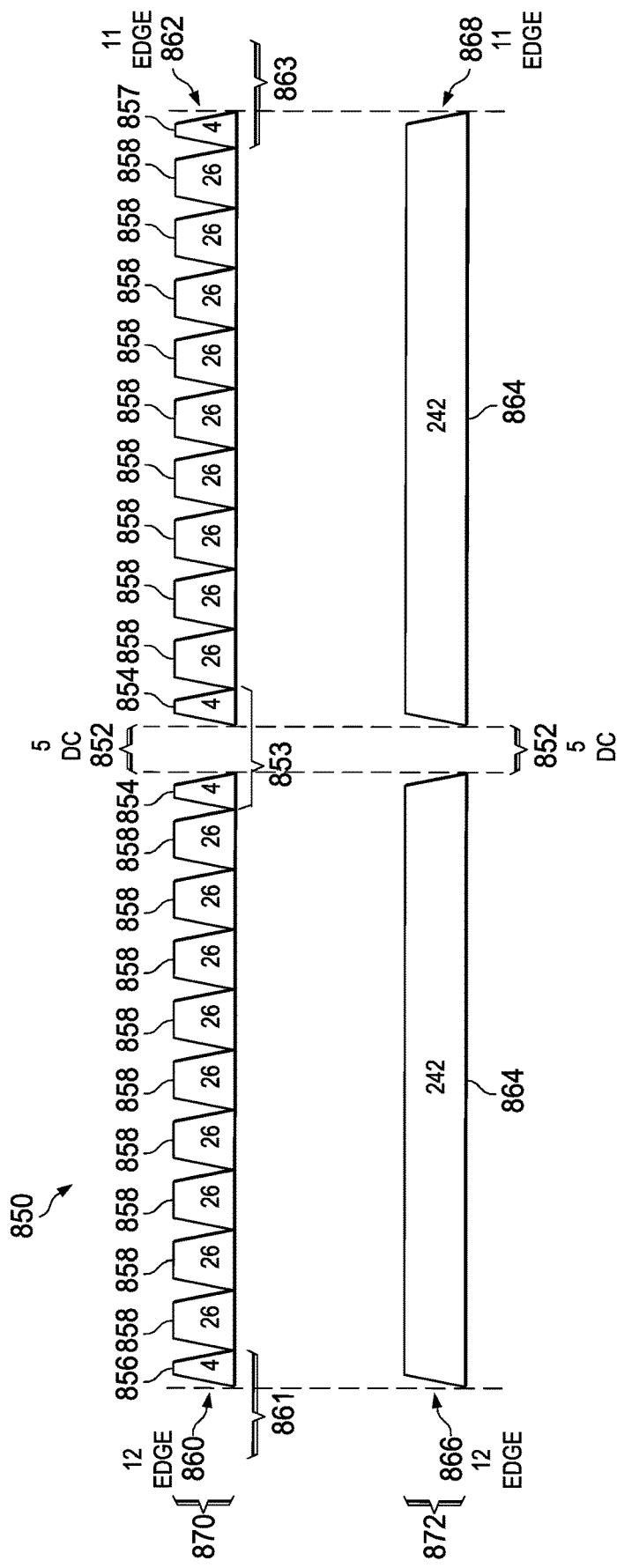

SYSTEM AND METHOD FOR COMMUNICATING AN ORTHOGONAL FREQUENCY DIVISION MULTIPLEXED (OFDM) FRAME FORMAT

CROSS-REFERENCE TO RELATED APPLICATIONS

This application is a continuation of U.S. application Ser. No. 16/245,327 filed on Jan. 11, 2019, and entitled "System and Method for Communicating an Orthogonal Frequency Division Multiplexed (OFDM) Frame Format," which is a continuation of U.S. application Ser. No. 15/006,776 filed on Jan. 26, 2016, and entitled "System and Method for Communicating an Orthogonal Frequency Division Multiplexed (OFDM) Frame Format," which claims the benefit of U.S. Provisional Application No. 62/107,936 filed on Jan. 26, 2015, which applications are hereby incorporated herein by reference.

TECHNICAL FIELD

The present invention relates to a system and method for wireless communications, and, in particular, to a system and method for communicating an orthogonal frequency division multiplexing (OFDM) frame format.

BACKGROUND

Next generation Wireless Local Area Networks (WLANs) will be deployed in high-density environments that include access points (APs) providing wireless access to large numbers of stations (STAs) in the same geographical area. It is desirable for next generation WLANs to simultaneously support various traffic types having diverse quality of service (QoS) requirements, because mobile devices are increasingly used to access streaming video, mobile gaming, and other services.

SUMMARY

Technical advantages are generally achieved, by embodiments of this disclosure which describe a system and method for communicating an orthogonal frequency division multiplexing (OFDM) frame format.

In accordance with an embodiment, a method for communicating data is provided. In this example, the method includes transmitting an orthogonal frequency division multiple access (OFDMA) frame. The OFDMA frame includes a first set of data and pilot tones, a second set of data and pilot tones, and a direct current (DC) region positioned between the first set of data and pilot tones and the second set of data and pilot tones. The DC region consisting of seven null tones that exclude data and pilot signaling. An apparatus for performing this method is also provided.

In accordance with another embodiment, another method for communicating data is provided. In this example, the method includes receiving an orthogonal frequency division multiple access (OFDMA) frame. The OFDMA frame includes a first set of data and pilot tones, a second set of data and pilot tones, and a direct current (DC) region positioned between the first set of data and pilot tones and the second set of data and pilot tones. The DC region consisting of seven null tones that exclude data and pilot signaling. The method further includes decoding at least a portion of the OFDMA frame. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which:

FIG. 4A is a diagram of an embodiment tone plan for a MU-OFDMA frame communicated over a 40 MHz channel;

FIG. 4B is a diagram of an embodiment tone plan for a SU-OFDMA frame communicated over a 40 MHz channel;

FIG. 6A is a diagram of another embodiment tone plan for a MU-OFDMA frame communicated over an 80 MHz channel;

FIG. 6B is a diagram of another embodiment tone plan for a SU-OFDMA frame communicated over an 80 MHz channel;

FIG. 7 illustrates embodiment tone plans for a 20 MHz OFDMA frame;

FIG. 8 illustrates embodiment tone plans for a 40 MHz OFDMA frame;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
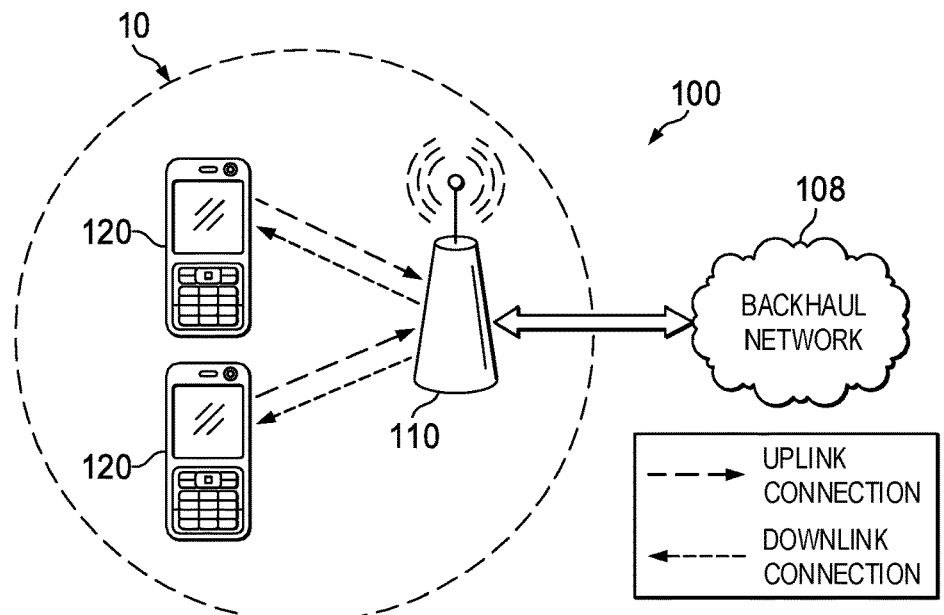
FIG. 1 is a diagram of a WiFi network for communicating data.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the designs and implementations illustrated and described herein, but may be modified within the scope of the appended claims along with their full scope of equivalents.

Institute of Electrical and Electronics Engineers (IEEE) 802.11ac defines a WLAN protocol for communicating data over 2.5 GigaHertz (GHz) and 5 GHz carrier frequencies, and may be capable of supporting aggregate throughput rates of up to 6.77 Gigabits per second (Gits/s). Even higher throughput rates may be needed to satisfy the performance goals of next-generation WLANs. As a result, IEEE 802.11ax is being developed as an extension to IEEE 802.11ac with a goal of providing up to 10 GBits over the 2.4 GHz and 5 GHz carrier frequencies.

Embodiment tone plans for communicating Orthogonal Frequency Division Multiple Access (OFDMA) frames over 20 Megahertz (MHz), 40 MHz, and 80 MHz channels are provided herein. One or more of the embodiment tone plans may be adopted by IEEE 802.11ax. In one embodiment, a Multi-User OFDMA (MU-OFDMA) frame is communicated over a 20 MHz channel. A MU-OFDMA frame may carry multiple data streams in different resource units (RUs) to one or more receiving devices. The 20 MHz MU-OFDMA frame may include eight 26-tone resource units (RUs), one 26-tone bifurcated RU, and a direct current (DC) region. The eight 26-tone RUs include twenty-six consecutive data and pilot tones, and the bifurcated 26-tone RU is split into two 13-tone portions each of which include thirteen consecutive data and pilot tones. The DC region may include seven null tones. In one example, the DC region of the 20 MHz MU-OFDMA frame consists of three DC tones and four null-data tones. Null tones are tones that exclude data, pilot, and control signaling, such as DC tones, guard tones, and/or null-data tones (e.g., data tones that have been re-purposed as null tones). Null tones may be positioned in-between adjacent RUs in an OFDMA frame to mitigate inter-symbol interference in-between the respective data streams carried by the adjacent RUs. Null tones may also be positioned in-between adjacent carriers (e.g., in an edge region) to mitigate inter-carrier interference and to protect RUs near the edge region from distortion due to transmission filtering and other effects. The eight 26-tone RUs, as well as the respective 13-tone portions of the bifurcated RU, are be distributed over two data and pilot regions, and the DC region is positioned in-between those data and pilot regions. In particular, four of the 26-tone RUs and one 13-tone portion of the bifurcated RU may be positioned in one data and pilot region; and the remaining four 26-tone RUs, as well as the other 13-tone portion of the bifurcated RU, may be positioned in the other data and pilot region. Each of the data and pilot regions may be positioned in-between the DC region and a corresponding edge region. One of the edge regions may include a pair of null-data tones and six guard tones. The other edge region may include a pair of null-data tones and five guard tones.

In another embodiment, a MU-OFDMA frame is communicated over an 80 MHz channel. The 80 MHz MU-OFDMA frame includes thirty-six 26-tone RUs, one 26-tone bifurcated RU, and a DC region consisting of seven DC tones. The RUs may be distributed over two inner-most data and pilot regions and two outer-most data and pilot regions. In one example, nine of the 26-tone RUs and one 13-tone portion of the bifurcated RU are positioned in each of the inner-most data and pilot regions; and nine of the 26-tone RUs are positioned in each of the outer-most data and pilot regions. The DC region may be positioned in-between the inner-most data and pilot regions, and each one of the outer-most data and pilot regions may be positioned in-between a respective one of the inner-most data and pilot regions and a corresponding edge region. One of the edge regions may include a set of eight null-data tones and twelve guard tones. The other edge region may include a set of eight null-data tones and eleven guard tones. In some embodiments, a set of eight null-data tones is positioned in-between each inner-most data region and the corresponding outer-most data and pilot region. In such embodiments, the 80 MHz MU-OFDMA frame may carry thirty-six null-data tones.

In another embodiment, a Single User OFDMA (SU-OFDMA) frame is communicated over an 80 MHz channel. A SU-OFDMA frame may carry a single data stream to a receiving device. In one example, the 80 MHz SU-OFDMA frame includes 994 data and pilot tones, a 26-tone bifurcated RU, and seven DC tones. The 994 data and pilot tones are distributed over two inner-most data and pilot regions and two outer-most data and pilot regions. The two inner-most data and pilot regions each carry 242 consecutive data and pilot tones and one 13-tone portion of the bifurcated RU. The two outer-most data and pilot regions each carry 242 consecutive data and pilot tones. Similar to the 80 MHz MU-OFDMA frame, the DC region in the 80 MHz SU-OFDMA frame may be positioned in-between the inner-most data and pilot regions. Each one of the outer-most data and pilot regions in the 80 MHz SU-OFDMA frame may be positioned in-between a respective one of the inner-most data and pilot regions and a corresponding edge region. One of the edge regions may include twelve guard tones, and the other edge region includes eleven guard tones. These and other aspects are described in greater detail below.

FIG. 1 illustrates a network 100 for communicating data. The network 100 comprises an access point (AP) 110 having a coverage area 101, a plurality of mobile stations 120, and a backhaul network 130. As shown, the AP 110 establishes uplink (dashed line) and/or downlink (dotted line) connections with the mobile stations 120, which serve to carry data from the mobile stations 120 to the AP 110 and vice-versa. Data carried over the uplink/downlink connections may include data communicated between the mobile stations 120, as well as data communicated to/from a remote-end (not shown) by way of the backhaul network 130. As used herein, the term "access point (AP)" refers to any component (or collection of components) configured to provide wireless access to a network, such as an enhanced base station (eNB), a macro-cell, a femtocell, a Wi-Fi access point (AP), or other wirelessly enabled devices. APs may provide wireless access in accordance with one or more wireless communication protocols, e.g., Wi-Fi 802.11a/b/g/n/ac/ax, long term evolution (LTE), LTE advanced (LTE-A), High Speed Packet Access (HSPA), etc. As used herein, the term "mobile station" refers to any component (or collection of components) capable of establishing a wireless connection with an AP, such as a station (STA), a user equipment (UE), and other wirelessly enabled devices. In some embodiments, the network 100 may comprise various other wireless devices, such as relays, low power nodes, etc.

Figure 2:
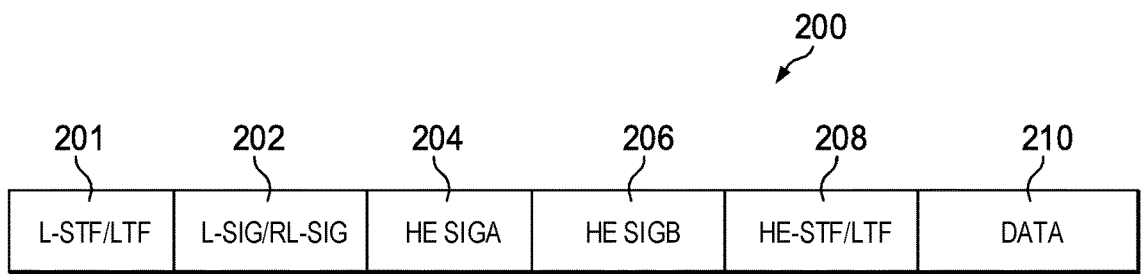
FIG. 2 is an embodiment frame structure for an orthogonal frequency division multiplexing (OFDM) frame.

FIG. 2 is a diagram of an embodiment frame structure for a downlink (DL) OFDM frame 200. As shown, the downlink OFDM frame 200 includes a legacy short training field (L-STF)/long training field (LTF) 201, a legacy signaling field (L-SIG)/repeated legacy (RL) SIG field 202, a high efficiency (HE) first signal (SIGA) field 204, a HE second signal (SIGB) field 206, a HE-STF/LTF field 208, and a data payload field 210. Scheduling index information is embedded in the SIGB field 206. The index information associates identifiers (IDs) assigned to individual STAs or groups of STAs, with starting or ending positions for subsets of assigned RUs in a sequence of RUs carried by the OFDM frame. For example, the scheduling index information may indicate a leading RU and/or trailing RU in a subset of RUs allocated to a STA, and may enable the STA to locate the subset of allocated RUs upon receiving the frame.

Figure 3A:
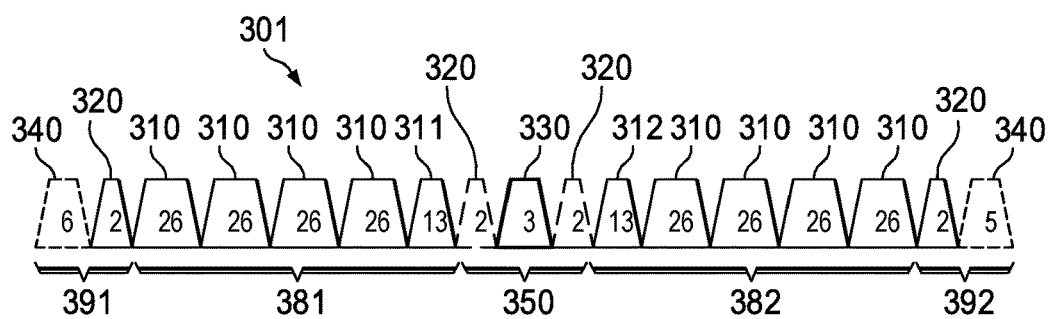
FIG. 3A is a diagram of an embodiment tone plan for a Multi-User Orthogonal Frequency Division Multiple Access (OFDMA) frame (MU-OFDMA) frame communicated over a 20 MegaHertz (MHz) channel.

FIG. 3A is a diagram of an embodiment tone plan for a MU-OFDMA frame 301 that is communicated over a 20 MHz channel. As shown, the MU-OFDMA frame 301 includes eight 26-tone RUs 310, two portions 311, 312 of a bifurcated 26-tone RU, null-data tones 320, and DC tones 330. In this example, three DC tones 330 and four null-data tones 320 are included in a DC region 350. Four of the 26-tone RUs 310 and one portion 311 of the bifurcated RU are included in the data and pilot region 381, and four of the 26-tone RUs 310 and the remaining portion 312 of the bifurcated RU are included in the data and pilot region 382. The DC region 350 is positioned in-between the data and pilot region 381 and the data and pilot region 382. Two of the null-data tones 320 are included in an edge region 391 and two of the null-data tones 320 are positioned in an edge region 392. Additionally, six guard tones 340 are included in the edge region 391, and the five guard tones 340 are included in the edge region 392. In some embodiments, the guard tones 340 are included within the 20 MHz channel over which MU-OFDMA frame 301 is transmitted. In other embodiments, the guard tones 340 tones that are outside the 20 MHz channel over which the ME-OFDMA frame 301 is transmitted.

Figure 3B:
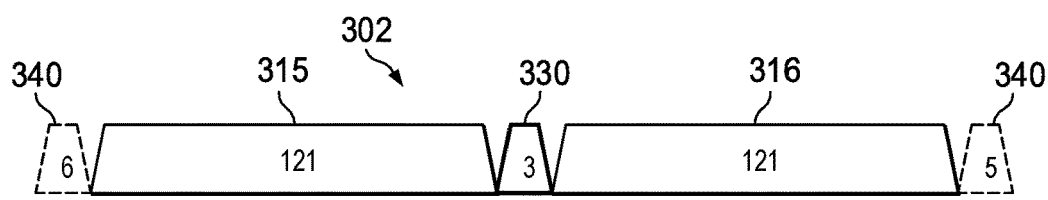
FIG. 3B is a diagram of an embodiment tone plan for a Single-User OFDMA frame (SU-OFDMA) frame communicated over a 20 MHz channel.

FIG. 3B is a diagram of an embodiment tone plan for a SU-OFDMA frame 302 that is communicated over a 20 MHz channel. As shown, the SU-OFDMA frame 302 includes data and pilot regions 315, 316 and DC tones 330. In this example, the data and pilot regions 315, 316 each include one-hundred and twenty-one consecutive data and pilot tones. The DC tones 330 are positioned in-between the data and pilot regions 315, 316. The data and pilot region 315 is positioned in-between six guard tones 340 and the DC tones 330. The data and pilot region 316 is positioned in-between the DC tones 330 and five guard tones 340. In some embodiments, the guard tones 340 are included within the 20 MHz channel over which the SU-OFDMA frame 302 is transmitted. In other embodiments, the guard tones 340 are positioned outside the 20 MHz channel over which the SU-OFDMA frame 302 is transmitted.

Embodiments of this disclosure provide tone plans for OFDMA frames communicated over 40 MHz channels. FIG. 4A is a diagram of an embodiment tone plan for a MU-OFDMA frame 401 that is communicated over a 40 MHz channel. As shown, the MU-OFDMA frame 401 includes eighteen 26-tone RUs 410, null-data tones 420, and DC tones 430. Five DC tones 430 and eight null-data tones 420 are included in a DC region 450. Nine of the 26-tone RUs 410 are included in a data and pilot region 481, and nine of the 26-tone RUs 410 are included in a data and pilot region 482. The DC region 450 is positioned in-between the data and pilot region 481 and the data and pilot region 482. Four null-data tones 420 are included in an edge region 491, and four null-data tones 420 are included in an edge region 492. Additionally, twelve guard tones 440 are included in the edge region 491, and the eleven guard tones 440 are included in the edge region 492. In some embodiments, the guard tones 440 are included within the 40 MHz channel over which the MU-OFDMA frame 401 is transmitted. In other embodiments, the guard tones 440 tones are outside the 40 MHz channel over which the MU-OFDMA frame 401 is transmitted.

FIG. 4B is a diagram of an embodiment tone plan for a SU-OFDMA frame 402 that is communicated over a 40 MHz channel. As shown, the SU-OFDMA frame 402 includes data and pilot regions 415, 416 and DC tones 430. In this example, the data and pilot regions 415, 416 each include two-hundred and forty-two consecutive data and pilot tones. The DC tones 430 are positioned in-between the data and pilot regions 415, 416. The data and pilot region 415 is positioned in-between twelve guard tones 440 and the DC tones 430. The data and pilot region 416 is positioned in-between the DC tones 430 and eleven guard tones 440. In some embodiments, the guard tones 440 are included within the 40 MHz channel over which the SU-OFDMA frame 402 is transmitted. In other embodiments, the guard tones 440 tones are outside the 40 MHz channel over which the SU-OFDMA frame 402 is transmitted.

Figure 5A:
FIG. 5A is a diagram of an embodiment tone plan for a MU-OFDMA frame communicated over an 80 MHz channel.

Embodiments of this disclosure provide tone plans for OFDMA frames communicated over 80 MHz channels. FIG. 5A is a diagram of an embodiment tone plan for a MU-OFDMA frame 501 that is communicated over an 80 MHz channel. As shown, the MU-OFDMA frame 501 includes 26-tone RUs 510, portions 511, 512 of a bifurcated 26-tone RU, null-data tones 520, and five DC tones 530. In this example, the 26-tone RUs 510 and the portions 511, 512 of the bifurcated RU are distributed over four data and pilot regions 581, 582, 583, 584. In particular, the data and pilot region 581 includes nine 26-tone RUs 510 and one portion 511 of the bifurcated RU, and the data and pilot region 582 includes nine 26-tone RUs 510 and the remaining portion 512 of the bifurcated RU. The four data and pilot regions 583, 584 each include nine 26-tone RUs 510. The DC region 550 is positioned in-between the data and pilot region 581 and the data and pilot region 582. The data and pilot region 581 is positioned in-between the DC region and the data and pilot region 584, and the data and pilot region 582 is positioned in-between the DC region and the data and pilot region 583. The data and pilot region 584 is positioned in-between the data and pilot region 581 and an edge region 591, and the data and pilot region 583 is positioned in-between the data and pilot region 582 and an edge region 592. Because of their relative positioning with respect to one another, the data and pilot regions 581, 582 may be referred to herein as the inner-most data and pilot regions of the MU-OFDMA frame 501, and the data and pilot regions 583, 584 may be referred to herein as the outer-most data and pilot regions of the MU-OFDMA frame 501. Eight null-data tones 520 are included in an edge region 591, and eight null-data tones 520 are included in an edge region 592. Additionally, thirteen guard tones 540 are included in the edge region 591, and twelve guard tones 540 are included in the edge region 592. In some embodiments, the guard tones 540 are included within the 80 MHz channel over which the MU-OFDMA frame 501 is transmitted. In other embodiments, the guard tones 540 tones are outside the 80 MHz channel over which the MU-OFDMA frame 501 is transmitted. Eight null-data tones 520 are positioned in-between the data and pilot region 581, 584. Similarly, eight null-data tones 520 are positioned in-between the data and pilot region 582, 583.

Figure 5B:
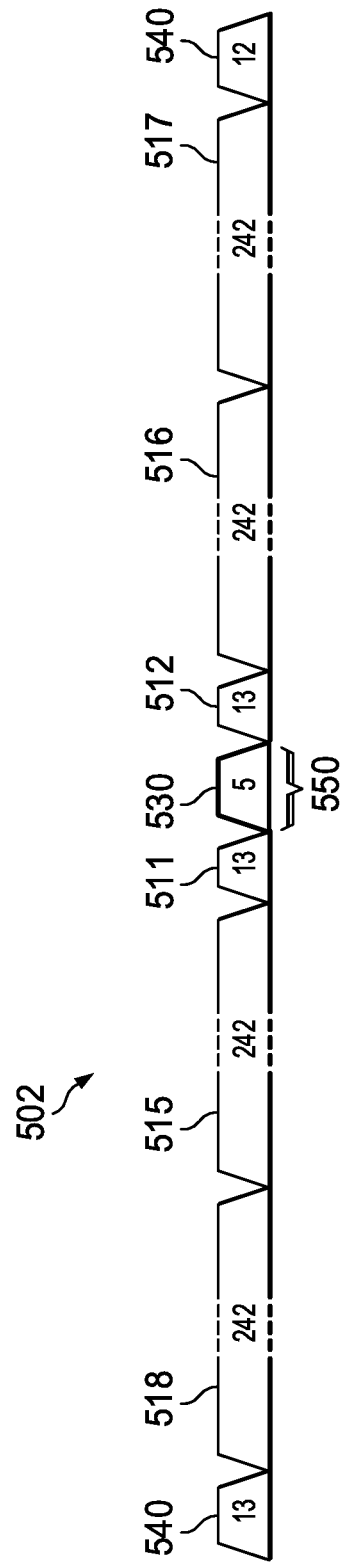
FIG. 5B is a diagram of an embodiment tone plan for a SU-OFDMA frame communicated over an 80 MHz channel.

FIG. 5B is a diagram of an embodiment tone plan for a SU-OFDMA frame 502 that is communicated over an 80 MHz channel. As shown, the SU-OFDMA frame 502 includes data and pilot regions 515, 516, 517, 518, portions 511, 512 of a bifurcated 26-tone RU, and five DC tones 530. In this example, the data and pilot regions 515, 516, 517, 518 each include two-hundred and forty-two consecutive data and pilot tones. The five DC tones 530 are positioned in-between the data and pilot regions 515, 516. The data and pilot regions 515, 518 are positioned in-between twelve guard tones 540 and the DC tones 530. The data and pilot region 516, 517 are positioned in-between the DC tones 530 and eleven guard tones 540. In some embodiments, the guard tones 540 are included within the 80 MHz channel over which the SU-OFDMA frame 502 is transmitted. In other embodiments, the guard tones 540 tones are outside the 80 MHz channel over which the SU-OFDMA frame 502 is transmitted.

FIG. 6A is a diagram of an embodiment tone plan for a MU-OFDMA frame 601 that is communicated over an 80 MHz channel. The RUs 610, 611, 612, tones 620, 630, 640, and regions 650, 681, 682, 683, 684, 691, 692 in the MU-OFDMA frame 601 have similar arrangements and configurations to like components/regions of the MU-OFDMA frame 501, except that the DC region 650 includes seven DC tones 630, the edge region 691 includes twelve guard tones 640, and the edge region 692 includes eleven guard tones 640.

FIG. 6B is a diagram of an embodiment tone plan for a SU-OFDMA frame 502 that is communicated over an 80 MHz channel. The data and pilot regions in the SU-OFDMA frame 602 have similar arrangements and configurations to like components/regions of the SU-OFDMA frame 502, except that the DC region 650 includes seven DC tones 630, as well as that there are twelve guard tones 640 positioned outside of the data and pilot region 618 and eleven guard tones 640 positioned outside of the data and pilot region 617.

Aspects of this disclosure provide embodiment frame formats for use in a wireless environment such as an Institute of Electrical and Electronics Engineers (IEEE) 802.11ax network. Embodiments provide tone plans for the orthogonal frequency division multiple access (OFDMA) resource units (RUs) for 20 MHz, 40 MHz, and 80 MHz OFDMA transmissions. An embodiment at 20 MHz includes 6 null tones on one edge of an orthogonal frequency division multiplexing (OFDM) frame, 5 null tones on the other edge of the OFDM frame, and three null tones in a direct current (DC) region. An embodiment OFDM frame for 40 MHz has 242×2=484 data and pilot tones grouped in RUs, with additional null tones in the DC region and on the edges. Single user (SU) frames are scheduled for a single user. Multi-user OFDMA frames can be scheduled for multiple users. In other embodiments, for 80 MHz OFDM transmission, there are either 5 null tones in the DC region or 7 null tones in the DC region. In another embodiment, 20 MHz, 40 MHz, and 80 MHz OFDMA tone plans use 26-tone RUs, and 20 MHz SU scheduling uses 242-tone RUs. The OFDMA or SU frame may be a downlink frame or an uplink frame.

In an embodiment OFDM frame, there are 8 leftover tones within each 242 tone block. Leftover tones may be used as separators between different RUs, especially smaller size RUs, to reduce leakage from adjacent blocks. Additional null tones near the edge may be used for protection from pulse shaping filters, adjacent blockers, etc. No data is transmitted on the leftover tones, DC tones, or edge tones. That is, leftover tones, DC tones, and edge tones are all null tones. Leftover tones may be adjacent to edge tones, in which case the number of null tones near the edge is equal to the sum of the number of edge tones and the number of leftover tones adjacent to the edge tones. Also, leftover tones may be adjacent to the DC tones, in which case the number of null tones in the DC region is equal to the sum of the number of DC tones and the number of leftover tones adjacent to the DC region. Edge tones may also be known as guard tones.

There are several factors which may be considered in determining tone plans and RU allocation. RUs may be aligned between 20 MHz, 40 MHz, and 80 MHz frame configurations. Null tones in the DC regions and null tones at the edges may be allocated based on spectral mask and carrier frequency offset (CFO) requirements to protect tones in RUs near the edge tones and the DC tones. Other considerations in determining tone plans and RU allocations include the utilization of leftover tones, for example, to align the RUs and protect tones in RUs near DC tones and edge tones. Edge tones, DC tones, and leftover tones are null tones, and are not used for transmitting data or pilots.

Distortion may affect tones in RUs near the edges of OFDMA frames more significantly than tones in RUs near the edges of SU frames. In one example, the tone plans used for both SU frames and OFDMA frames are similar. Alternatively, the tone for SU frames and OFDMA frames are different. In one example, additional null tones are used in OFDMA frames to provide additional protection for RUs near the edge and in the DC region. Thus, an OFDMA frame may have more null tones near the edge and null tones in the DC region compared to an SU frame. Null tones near the edge are positioned at the edges of the transmission bands as guard tones to mitigate the effect of transmission filtering on the data and pilot tones. Null tones in the DC region are empty subcarriers (i.e. subcarriers that do not carry data/information) that are used by mobile devices to locate the center of the OFDM frequency band.

Embodiments provide tone plans for 40 MHz and 80 MHz OFDM frames. In some embodiments, 5 DC tones are used, for example with 40 ppm CFO. In other embodiments, for example with 80 MHz, 7 DC tones or 5 DC tones may be used. In various embodiments, the null tones are utilized to align the RUs and to protect tones near the DC region and the edge.

In an embodiment 40 MHz tone plan there are 2 242-tone RUs containing data and pilot tones, and 28 tones allocated for null tones in the DC region and null tones near the edge. In one example, there are 5 null tones in the DC region and [12,11] null tones near the edges. The notation [A, B] denotes A edge tones on one edge of an OFDM frame and B edge tones on the other edge of the OFDM frame. In an embodiment 80 MHz tone plan, there are [13,12] null tones near the edges and 5 null tones in the DC region. In another embodiment 80 MHz tone plan, there are [12,11] null tones near the edges and 7 null tones in the DC region. There may be 994 tones for data, pilots, and leftover tones. In one embodiment, the tone plan is the same for SU frames and OFDMA frames. Alternatively, the tone plan for SU frames is different than the tone plan for OFDMA frames.

Before frames are transmitted, transmission filtering may be performed. The transmission filter may be based on the spectral mask. Leftover tones may be used to protect RUs near null tones at the edges and null tones in the DC region.

In OFDMA, different RUs are allocated to different STAs. Any number of RUs may be allocated for a particular STA. Each STA estimates the channel and recovers the entire message. The signaling field is used by each STA to determine which RU(s) are allocated to that particular STA.

FIG. 7 illustrates a tone plan 740 for a 20 MHz OFDMA frame. There are a total of 242 data, pilot, and leftover tones. Leftover tones are used for the protection of RUs near the DC tones and edge tones, to increase the number of null tones in the DC region and the number of null tones near the edges. A leftover tone used to protect the RUs near the DC tones increases the number of null tones in the DC region. Also, a leftover tone used to protect the RUs near the edge tones increases the number of null tones near the edges. DC tones, edge tones, and leftover tones are all null tones. The tones in RUs 744 include data and pilot tones, and the tones 746, 747, and 742 are the leftover tones, which are null tones. Pilot tones may be distributed throughout the RUs in the tones in RUs 744. The separate pilot tones carried by an RU may be used to adjust or estimate the phase and/or frequency offsets of data tones carried in the RU. For example, in an uplink OFDMA frame carrying RUs transmitted by different STAs, the pilot tones carried in the respective RUs may be used by a serving AP to perform residual carrier frequency offset estimation on the uplink OFDMA frame. There are 234 data and pilot tones, including the 8 26-tone RUs 744 and the 26-tone RU 745 that is split into 13 tones on each side of the null tones in the DC region 743. There are 8 leftover tones, which are used to protect RUs near edge tones and DC tones. Two of the leftover tones 742 are used on each side of the DC tones 748. The two leftover tones 746 are placed adjacent to the 6 edge tones 749, for 8 null tones near the edge 747. Also, the two leftover tones 746 are adjacent to the 5 edge tones 749 for 7 null tones near the edge 747.

FIG. 8 illustrates tone plans 850 for a 40 MHz transmission for OFDMA and SU frames. There are 484 tones for data, pilot, and leftover tones, and 28 tones for DC and edge tones. Tone plans 850 includes the OFDMA tone plan 870 and the SU tone plan 872. The tones in the OFDMA tone plan 870 are sent to or received from multiple STAs. The tones in the SU tone plan 872 are sent to or received from a single STA.

The SU tone plan 872 includes the 5 DC tones 852. The 5 DC tones 852 are included in a DC region. On each side of the DC tones 852 is a 242-tone RU 864. Each 242-tone RU includes 4 pilot tones and 238 data tones. One edge includes 12 edge tones 866. The other edge includes 11 edge tones 868.

RUs and leftover tones of the OFDMA tone plan 870 are aligned with RUs of the SU tone plan 872. The OFDMA tone plan 870 includes 5 DC tones 852. Four leftover tones 854 are on each side of the DC tones 852 for 13 null tones in the DC region 853 to protect the RUs near the null tones in the DC region 853. On one edge there are 12 edge tones 860. Four leftover tones 856 are adjacent to edge tones 860 for 16 null tones near the edge 16. On the other edge are 11 edge tones 862 and four leftover tones 857 adjacent to the edge tones 862 for 15 null tones near the edge 863. The 468 data and pilot tones are distributed over 18 26-tone RUs. Nine of the 26-tone RUs are positioned on each side of the DC region 853. Each 26-tone RU includes 2 pilot tones and 24 data tones.

Figure 9:
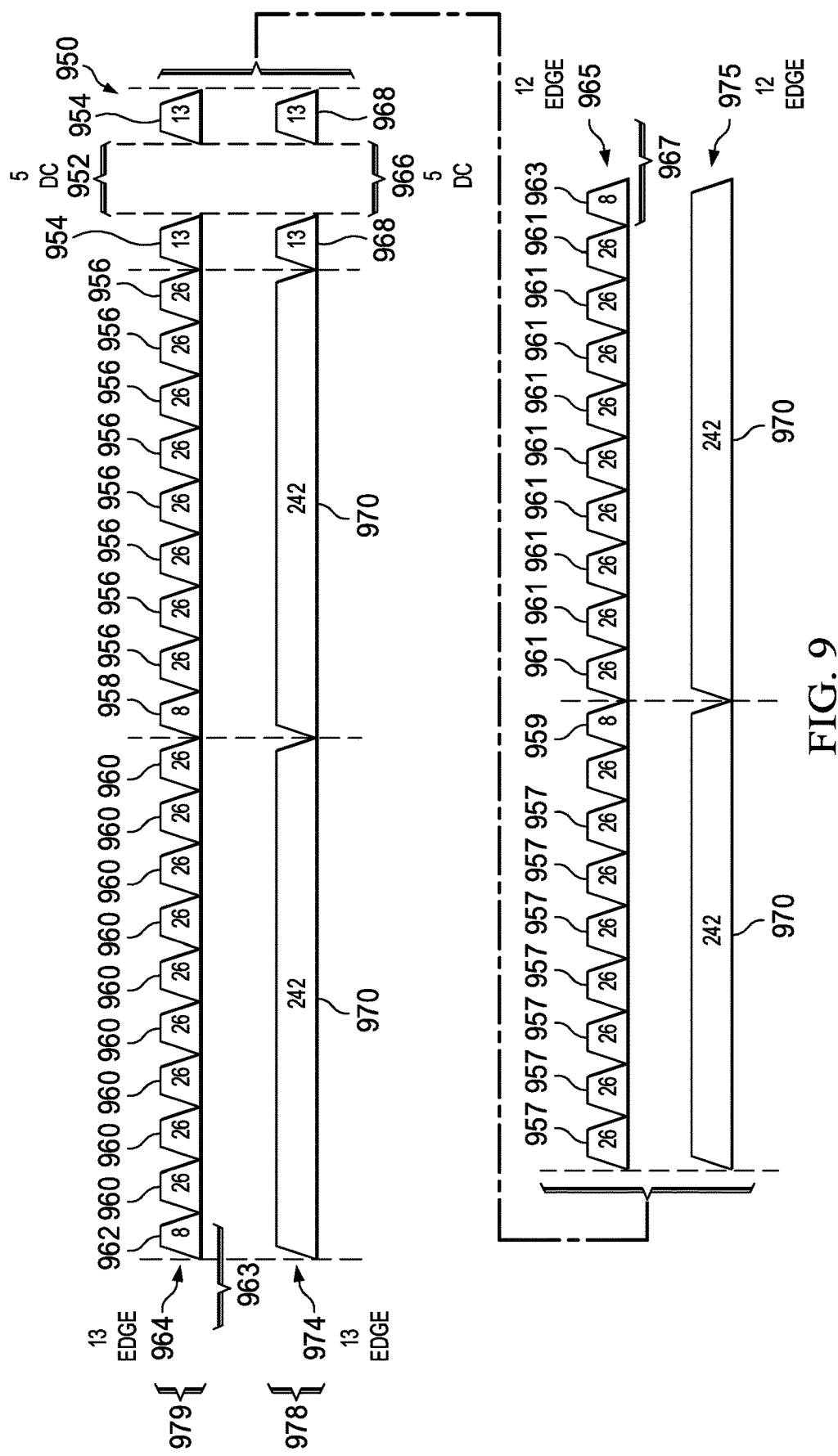
FIG. 9 illustrates embodiment tone plans for 80 MHz OFDMA and SU frames.

FIG. 9 illustrates the 80 MHz tone plans 950 for OFDMA and SU frames. There are 994 data, pilot, and leftover tones, and 30 DC and edge tones. The tone plans 950 include the OFDMA tone plan 979 and the SU tone plan 978. The tones in the OFDMA tone plan 979 are sent to or received from multiple STAs. The tones in the SU tone plan 978 are sent to or received from a single STA. The RUs for the OFDMA tone plan 979 are aligned with the RUs of the SU tone plan 978.

The SU tone plan 978 contains 5 DC tones 966. The RU 968 is split into two 13-tone portions. The five DC tones 966 are positioned in-between the respective 13-tone portions of the RU 968. The tones in RU 970 include two sets of 242-tone RUs on each side, for 4 242-tone RUs. 13 edge tones 974 are at one edge and 12 edge tones 975 are at the opposite edge.

RUs, DC tones, and edge tones of the OFDMA tone plan 979 are aligned with RUs, DC tones, and edge tones of the SU tone plan 978, respectively. There are 262 pilot and data tones in the OFDMA tone plan 979, grouped into 37 26-tone RUs. The OFDMA tone plan 979 includes 5 DC tones 952, which are aligned with DC tones 966. There are a total of 5 null tones in the DC region. Also, the OFDMA tone plan 979 includes 13 edge tones 964. 8 leftover tones 962 are adjacent to the edge tones 964, for a total of 21 null tones at the edge 963. Also, OFDMA tone plan 979 contains 12 edge tones 965. The leftover tones 963 are adjacent to the edge tones 965, for a total of 20 null tones near the edge 967. The 26-tone RU 954 is split by DC tones 952, with 13 tones on each side of DC tones 952. There are four sets of 9 26-tone RUs 960, 956, 957, and 961. The leftover tones include the tones 962, 958, 959, 963. The tones 958 and 959 are between sets of 9 26-tone RUs.

Figure 10:
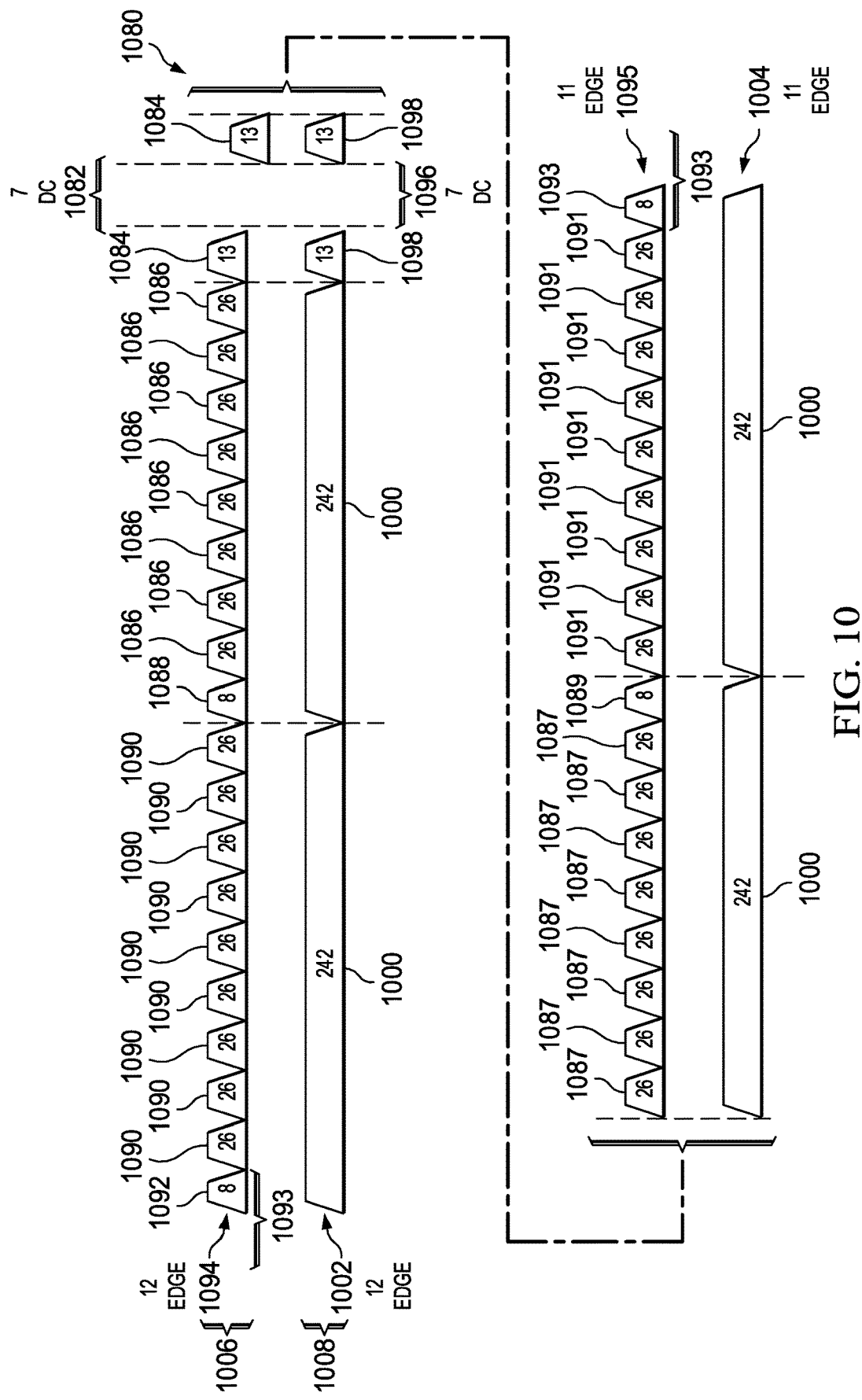
FIG. 10 illustrates additional embodiment tone plans for 80 MHz OFDMA and SU frames.

FIG. 10 illustrates 80 MHz tone plans 1080 for OFDMA frames and SU frames. There are 294 data, pilot, and leftover tones, and 30 DC and edge tones. The tone plans 1080 include the OFDMA tone plan 1006 and the SU tone plan 1008. The tones in the OFDMA tone plan 1006 are sent to or received from multiple STAs. The tones in the SU tone plan 1008 are sent to or received from a single STA. The RUs, DC tones, and edge tones of the OFDMA tone plan 1006 are aligned with the RUs, DC tones, and edge tones of the SU tone plan 1008, respectively.

The SU tone plan 1008 contains 7 DC tones 1096. There are a total of 7 null tones in the DC region. Also, the RU 1098 includes two 13-tone portions. The DC tones 1096 are positioned in-between the respective 13-tone portions of the RU 1098. The RUs 1000 include two sets of 242-tone RUs on each side of the DC tones 1096 and the RU 1098. 12 edge tones 1002 are at one edge, for a total of 12 null tones at that edge, and 11 edge tones 1004 are at the opposite edge, for 11 null tones at that edge.

The OFDMA tone plan 1006 is aligned with the SU tone plan 1008. There are a total of 37 26-tone RUs in the OFDMA tone plan 1006. The OFDMA tone plan 1006 includes 7 DC tones 1082, for a total of 7 null tones in the DC region. Also, the OFDMA tone plan 1006 includes 12 edge tones 1094 and 11 edge tones 1095. The leftover tones include four sets of eight tones 1092, 1088, 1089, and 1093. The 8 tones 1092 are adjacent to edge tones 1094, for 20 null tones at the edge 1093. Also, 8 leftover tones 1093 are adjacent to edge tones 1095, for 21 null tones at the edge 1097. The tones 1088 and the tones 1089 are between sets of 9 26-tone RUs. The 26 tones 1084 include 13 tones on each side of the DC tones 1082. There are four sets of 9 26-tone RUs 1090, 1086, 1087, and 1091

In another embodiment, there are a total of 37 26-tone RUs. One of the 26-tone RUs may be used for scheduling STAs.

Additional examples may include different sized RUs. For example, RUs may contain 26 tones, 52 tones, 106 tones, 242 tones, or another number of tones.

For a downlink frame based on the signaling field of the frame, the receiver determines which RUs are scheduled for that STA. The receiver may perform CFO estimation using the pilots. Residual frequency offset compensation may include estimating a carrier frequency offset based on dedicated pilots carried in OFDMA transmission.

Embodiments include tone plans for 40 MHz and 80 MHz OFDMA transmissions. In one embodiment, the OFDMA tone plan is the same as or similar to the SU tone plan. Alternatively, the OFDMA tone plan is different than the SU tone plan. In an embodiment, there are 5 DC tones for 40 ppm CFO. In an embodiment, 26-tone RUs for OFDMA frames are aligned with 242-tone RUs for SU frames, and one RU does not overlap the position of another RU. In an embodiment, leftover tones are utilized to align RUs and protect tones near DC tones and edge tones. In an embodiment, one 26-tone RU is used for scheduling in 80 MHz.

Figure 11:
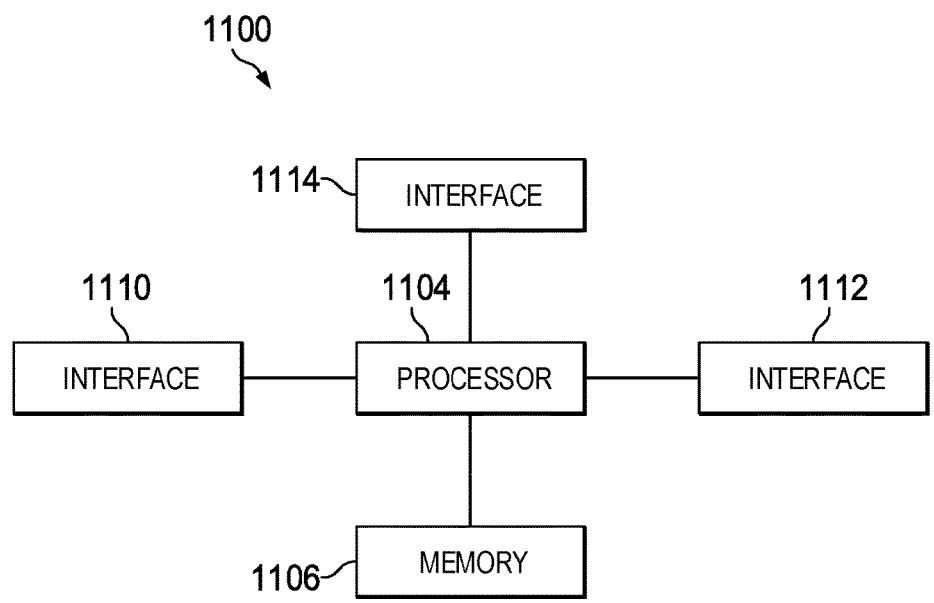
FIG. 11 is a block diagram of an embodiment processing system.

FIG. 11 a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 1i, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
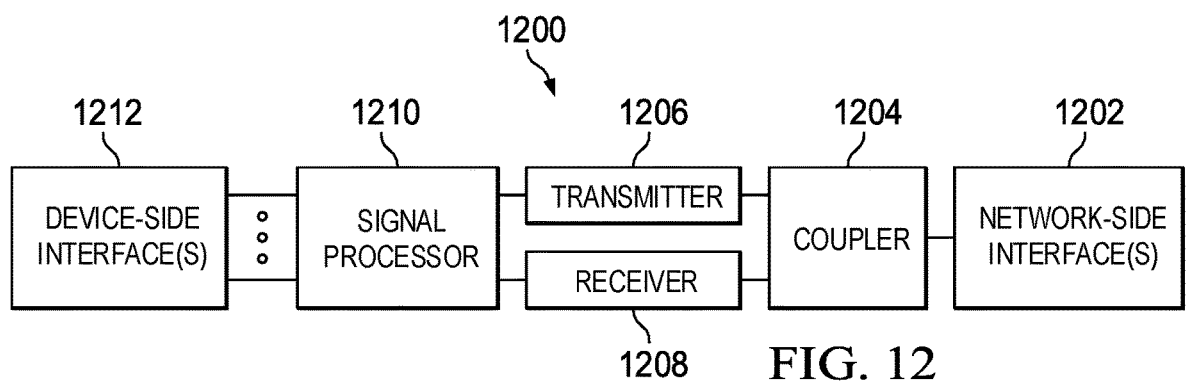
FIG. 12 is a block diagram of an embodiment a transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to enable bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless communications, comprising:
   transmitting or receiving, by a communication apparatus, an 8$o$ MHz frame according to a tone plan for the 80 MHz frame,
   wherein the tone plan comprises 12 guard tones, first 18 26-tone resource units (RUs), first 13 tones of a bifurcated 26-tone RU, 7 DC tones, a remaining 13 tones of the bifurcated 26-tone RU, second 18 26-tone RUs, and 11 guard tones, and
   wherein the first 18 26-tone RUs are positioned between the 12 guard tones and the first 13 tones of the bifurcated 26-tone RU, the first 13 tones of the bifurcated 26-tone RU are positioned between the first 18 26-tone RUs and the 7 DC tones, the 7 DC tones are positioned between the first 13 tones of the bifurcated 26-tone RU and the remaining 13 tones of the bifurcated 26-tone RU, the remaining 13 tones of the bifurcated 26-tone RU are positioned between the 7 DC tones and second 18 26-tone RUs, and the second 18 26-tone RUs are positioned between the remaining 13 tones of the bifurcated 26-tone RU and the 11 guard tones.

2. The method of claim 1, wherein the tone plan further comprises 32 leftover tones, the 32 leftover tones comprise a first leftover tone positioned between the 12 guard tones and the first 18 26-tone RUs, a second leftover tone positioned in between the first 18 26-tone RUs, a third leftover tone positioned in between the second 18 26-tone RUs, and a fourth leftover tone positioned between the second 18 26-tone RUs and the 11 guard tones.

3. The method of claim 2, wherein the tone plan further comprises:
   first 2 242-tone RUs positioned between the 12 guard tones and the first 13 tones of the bifurcated 26-tone RU, and
   second 2 242-tone RUs positioned between the remaining 13 tones of the bifurcated 26-tone RU and the 11 guard tones,
   wherein leftover tones are utilized to align a 26-tone RU and a 242-tone RU.

4. The method of claim 3, wherein each 242-tone RU is aligned with 9 26-tone RUs and 8 leftover tones in frequency domain.

5. A communication apparatus for wireless communications comprising:
   a processor; and
   a memory storing programmable instructions, when executed by the processor, cause the communication apparatus to:
      transmit or receive an 80 MHz frame according to a tone plan for the 80 MHz frame,
      wherein the tone plan comprises 12 guard tones, first 18 26-tone resource units (RUs), first 13 tones of a bifurcated 26-tone RU, 7 DC tones, a remaining 13 tones of the bifurcated 26-tone RU, second 18 26-tone RUs, and 11 guard tones, and
      wherein the first 18 26-tone RUs are positioned between the 12 guard tones and the first 13 tones of the bifurcated 26-tone RU, the first 13 tones of the bifurcated 26-tone RU are positioned between the first 18 26-tone RUs and the 7 DC tones, the 7 DC tones are positioned between the first 13 tones of the bifurcated 26-tone RU and the remaining 13 tones of the bifurcated 26-tone RU, the remaining 13 tones of the bifurcated 26-tone RU are positioned between the 7 DC tones and second 18 26-tone RUs, and the second 18 26-tone RUs are positioned between the remaining 13 tones of the bifurcated 26-tone RU and the 11 guard tones.

6. The communication apparatus of claim 5, wherein the tone plan further comprises 32 leftover tones, the 32 leftover tones comprise a first leftover tone positioned between the 12 guard tones and the first 18 26-tone RUs, a second leftover tone positioned in between the first 18 26-tone RUs, a third leftover tone positioned in between the second 18 26-tone RUs, and a fourth leftover tone positioned between the second 18 26-tone RUs and the 11 guard tones.

7. The communication apparatus of claim 6, wherein the tone plan further comprises:
   first 2 242-tone RUs positioned between the 12 guard tones and the first 13 tones of the bifurcated 26-tone RU, and
   second 2 242-tone RUs positioned between the remaining 13 tones of the bifurcated 26-tone RU and the 11 guard tones,
   wherein leftover tones are utilized to align a 26-tone RU and a 242-tone RU.

8. The communication apparatus of claim 7, wherein each 242-tone RU is aligned with 9 26-tone RUs and 8 leftover tones in frequency domain.

9. A non-transitory computer-readable storage medium having instructions stored thereon that, when executed by a processor, cause a communication apparatus to:
   transmit or receive an 80 MHz frame according to a tone plan for the 80 MHz frame,
   wherein the tone plan comprises 12 guard tones, first 18 26-tone resource units (RUs), first 13 tones of a bifurcated 26-tone RU, 7 DC tones, a remaining 13 tones of the bifurcated 26-tone RU, second 18 26-tone RUs, and 11 guard tones, and
   wherein the first 18 26-tone RUs are positioned between the 12 guard tones and the first 13 tones of the bifurcated 26-tone RU, the first 13 tones of the bifurcated 26-tone RU are positioned between the first 18 26-tone RUs and the 7 DC tones, the 7 DC tones are positioned between the first 13 tones of the bifurcated 26-tone RU and the remaining 13 tones of the bifurcated 26-tone RU, the remaining 13 tones of the bifurcated 26-tone RU are positioned between the 7 DC tones and second 18 26-tone RUs, and the second 18 26-tone RUs are positioned between the remaining 13 tones of the bifurcated 26-tone RU and the 11 guard tones.

10. The non-transitory computer-readable storage medium of claim 9, wherein the tone plan further comprises 32 leftover tones, the 32 leftover tones comprise a first leftover tone positioned between the 12 guard tones and the first 18 26-tone RUs, a second leftover tone positioned in between the first 18 26-tone RUs, a third leftover tone positioned in between the second 18 26-tone RUs, and a fourth leftover tone positioned between the second 18 26-tone RUs and the 11 guard tones.

11. The non-transitory computer-readable storage medium of claim 10, wherein the tone plan further comprises:
   first 2 242-tone RUs positioned between the 12 guard tones and the first 13 tones of the bifurcated 26-tone RU, and
   second 2 242-tone RUs positioned between the remaining 13 tones of the bifurcated 26-tone RU and the 11 guard tones,
   wherein leftover tones are utilized to align a 26-tone RU and a 242-tone RU.

12. The non-transitory computer-readable storage medium of claim 11, wherein each 242-tone RU is aligned with 9 26-tone RUs and 8 leftover tones in frequency domain.

* * * * *

UNITED STATES PATENT AND TRADEMARK OFFICE
CERTIFICATE OF CORRECTION

PATENT NO. : 10,999,033 B2  
APPLICATION NO. : 16/875256  
DATED : May 4, 2021  
INVENTOR(S) : Suh et al.

It is certified that error appears in the above-identified patent and that said Letters Patent is hereby corrected as shown below:

In the Claims

In Claim 1, Column 12; Line 57 delete "an 8o MHz" insert --an 80 MHz--

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*